United States Patent

Hechler et al.

Patent Number: 5,106,419
Date of Patent: Apr. 21, 1992

[54] GLASS-STABLE COLORED PIGMENTS

[75] Inventors: Wolfgang Hechler, LautertalReichenbach; Karl Osterried, Dieburg; Manfred Weigand, Weiterstadt, all of Fed. Rep. of Germany

[73] Assignee: Merck Patent Gesellschaft mit Beschränkter Haftung, Darmstadt, Fed. Rep. of Germany

[21] Appl. No.: 665,859

[22] Filed: Mar. 7, 1991

[30] Foreign Application Priority Data

Mar. 7, 1990 [DE] Fed. Rep. of Germany ....... 4007037

[51] Int. Cl.$^5$ .............................................. C04B 14/20
[52] U.S. Cl. .................... 106/418; 106/442; 106/459
[58] Field of Search ............... 106/415, 425, 436, 456, 106/418, 442, 459, 417

[56] References Cited

U.S. PATENT DOCUMENTS

| | | | |
|---|---|---|---|
| 4,435,220 | 3/1984 | Watanabe et al. | 106/415 |
| 4,867,793 | 9/1989 | Franz et al. | 106/415 |
| 4,959,090 | 9/1990 | Reinherz | 65/60.4 |

*Primary Examiner*—Mark L. Bell
*Assistant Examiner*—Chris Gallo
*Attorney, Agent, or Firm*—Millen, White & Zelano

[57] ABSTRACT

Colored pigments having an improved stability in decorative colors, engobes, glazes, and enamels, based on platelet-type substrates coated with metal oxides, in which the coating is free from alkaline earth metal oxides and contains a colored metal oxide or metal hydroxide and at least 10% by weight of aluminum oxide, are outstandingly suitable for pigmenting glazes and enamels.

11 Claims, No Drawings

GLASS-STABLE COLORED PIGMENTS

BACKGROUND OF THE INVENTION

The invention relates to glaze-stable colored pigments based on platelet-type substrates coated with metal oxides which are stable in decorative colors engobes, glazes and enamels.

Many pigments which are incorporated into glazes, enamels or similar materials, are known. However they suffer from a number of drawbacks. Thus, many of them are unstable at the normal firing temperatures of about 700°–800° C., since they are strongly attacked by the aggressive molten fluids. Again, others contain a high proportion of environmentally dangerous heavy metals, for example cadmium, in order to ensure a stable coloration, for example in the yellow and red color region.

A need has therefore arisen for pigments which do not have the above drawbacks or have them only to a small degree.

Platelet-type pigments, coated with metal oxide, which contain in the outer coating alkaline earth metal oxides or hydroxides, e.g., in an amount of 0.1–5% by weight are known from the U.S. Pat. No. 4,435,220.

SUMMARY OF THE INVENTION

It has now been found, surprisingly, that glaze-stable coated pigments are obtained if platelet-type substrates are coated in such a manner that the coating is free from alkaline earth metal oxides and contains a colored metal oxide or metal hydroxide and at least 10% by weight of aluminum oxide.

Compared with the pigments according to the invention, the pigments produced according to U.S. Pat. No. 4,435,220 have been found to be far less color-fast and heat-resistant when incorporated into frits. While the colors change in part even at about 850° C., the pigments according to the invention remain color-stable at least up to 1000° C.

Accordingly, the invention relates to colored pigments having an improved stability in decorative colors, engobes, glazes and enamels, based on platelet-type substrates coated with metal oxides, characterized in that the outer coating is essentially free from alkaline earth metal oxides and contains a colored metal oxide or metal hydroxide and at least about 10% by weight of aluminum oxide. By "essentially free" of alkaline earth metal oxides is meant that the pigments contain alkali metal oxide in an amount less than that which would negatively affect performance of the pigment in a glaze or enamel. In any event, pigments containing less than 0.1% by weight of alkaline earth metal oxide are intended.

The invention further relates to a process for the production of the pigments according to the invention for pigmenting glazes and enamels.

The invention finally relates to materials coated with glazes or enamels containing the pigments according to the invention.

Any platelet-type materials such as mica, talc, kaolin, glass platelets or metal platelets or platelet-type metal oxides and also mica flakes already coated with metal hydroxides or metal oxides, in particular titanium oxide, may in principle be employed as the platelet-type substrates. If mica flakes are used as substrates, the particle size range is about 1–100 μm, preferably 5–50 μm. Mica flakes <15 μm are particularly preferred. Metal platelets preferable are those which do not melt at the high application temperatures.

The particle size of the platelet-type substrates is usually in the same range as that specified for mica flakes. If, however, specific effects are aimed at, the average particle size may be outside the stated ranges, as would be known to one of ordinary skill in the art.

The substrates are mixed in aqueous suspension with a solution of an aluminum salt and at least one other metal salt. Of the metal salts, salts of iron, cobalt and chromium, such as $FeSO_4$, $FeCl_2$, $Fe(NH_4)_2(SO_4)_2$, $Fe(NO_3)_2$, $Fe_2(SO_4)_3$, $FeCl_3$, $FeNH_4(SO_4)_2$, $Fe(NO_3)_3$, $CoCl_3$, $CoSO_4$, $Co(NO_3)_2$, $CrCl_3$, $Cr_2(SO_4)_3$ and $CrNH_4(SO_4)_2$ are preferred. Of the aluminum salts, $Al_2(SO_4)_3$, $AlNH_4(SO_4)_2$, $AlCl_3$, $Al(NO_3)_2$, $AlNa(SO_4)_2$ and $AlK(SO_4)_2$ are, for example, suitable. If desired, solutions of suitable salts of other metals, for example zinc or titanium, may be added. The ratio of the metal salts to each other can be varied within wide limits. In addition the metal salts can also be used in the form of their hydrates. The proportion of aluminium salt must in any case be chosen such that the coating according to the invention of the finished pigments contains at least about 10% by weight of aluminum oxide, based on the coating layer. The ratios of metals in the finished pigments are analogous to the metal ratios in the starting solution, and the weight ratios of the metals in solution to the substrate are analogous to the ratios in the finished pigment.

The hydrolysis of the metal salts is carried out by processes known per se, such as, for example, by those described in DE 3,535,818 or in EP 0,077,959.

As a rule, a 5–25% by weight suspension is prepared of the platelet-type substrate in the solution of the metal salts which contains about 0.2 to 1.2 mmol of metal salt per $m^2$ of substrate surface to be coated. The pH is kept substantially constant by simultaneous addition of a base. A pH which is suitable for hydrolysis is usually 1–7. Suitable bases are, for example, alkali hydroxide solutions such as sodium hydroxide or potassium hydroxide solutions or even aqueous ammonia, as well as others, for example bases described in EP 0,007,959. The base is added as an approx. 5 to 35% solution. The salts are then hydrolysed and the metals precipitated out as their hydroxides or hydrated oxides. The substrates coated in this manner are then separated, dried at about 120° C. and calcined at about 400° to 950° C.

Of the pigments according to the invention those are preferred which contain essentially one or two other metal oxides in the coating besides aluminum oxide. The content of aluminium oxide in the coating is preferably about 10 to 70% by weight, in particular, 15 to 35% by weight, based on the coating layer.

Coatings containing, besides aluminum oxide, a high proportion of iron oxide in a ratio of about 10 to 0.5:1, in particular of about 3.5 to 2.5:1, are very particularly preferred.

To achieve the desired stabilization, substantial amounts of these oxides must be applied. It has been found expedient to apply the coating according to the invention in amounts from about 5 to 75% by weight, based on the total pigment.

The pigments according to the invention may in principle be used for any known application; however, because of the improved stability they find application preferably in the pigmentation of ceramic materials and silicaceous fluxes. In the following references the preparation of ceramic materials, silicaceous fluxes, enamels and glazes is described:

W. Bilke, Handbuch der Keramik, Schmidt Verlag, Freiburg i, Breisgau.

G. Weiss, Keramik Lexikon, Ullstein Verlag, Berlin 1984.

H. Kyri, Handbuch für Baze-Email, Bazer Rickmann Verlag, Köln, 1974.

W. Lehnhausen, Glasuren und ihre Farben, Wilhelm Knapp Verlag, Düsseldorf, 1973.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding Federal Republic of Germany Application P 40 07 037.9, filed Mar. 7, 1990, are hereby incorporated by reference.

EXAMPLES

Example 1

100 g of mica having a particle size <15 μm are suspended in 2 l of demineralized (DMD) water. The pH is adjusted to 5.5 by the addition of dilute hydrochloric acid. 152.1 g of $FeCl_3.6H_2O$ and 93.8 g of $Al_2(SO_4)_3.18H_2O$ are dissolved in DMD water. The solution is made up to a volume of 1.5 l. The Fe/Al salt solution is then added to the mica suspension, the pH being kept at 5.5 by the addition of a 10% sodium hydroxide solution. Various samples are taken, in particular after adding the following amounts of salt solution:

a) 600 ml
b) 675 ml
c) 750 ml
d) 850 ml
e) 1000 ml
f) 1200 ml

The samples are filtered off, washed free from salts with DMD water and dried for 15 hours at 120° C., before being roasted for 30 minutes at 900° C. Faintly orange (a) to orange-red (e, f) colored pigments are obtained.

Example 2

The procedure is analogous to Example 1, but with the Fe/Al ratio modified. The following amounts are used: 111 5 g of $FeCl_3.6H_2O$ and 23.9 g of $Al_2(SO_4)_3.18H_2O$.

Example 3

The procedure is analogous to Example 1, but with the Fe/Al ratio modified. The following amounts are used: 111.5 g of $FeCl_3.6H_2O$ and 215.4 g of $Al_2(SO_4)_3.18H_2O$.

Example 4

The procedure is analogous to Example 1, but with the Fe/Al ratio modified. The salt solution is additionally mixed with an aqueous $TiCl_4$ solution (400 g/l). The following amounts are used:
45.7 g of $FeCl_2.6H_2O$, 58.8 g of $Al_2(SO_4)_3.18H_2O$ and 80.1 ml of $TiCl_4$ solution.

Example 5

1 g of a pigment prepared according to Example 1 is mixed with 4 g of a ground, commercially available decorative color frit and 6 g of the screen-printing medium Degussa 80840 (from Degussa) and the mixture is once again ground in a centrifugal ball mill. This mixture is applied by the screen-printing process to a body (61 T screen). Firing is then carried out for 5 minutes at 850° C. A glossy, red-orange decorative film is obtained.

Other bodies are printed in an analogous manner and fired at 950° C. and 1000° C. The color remains largely unchanged.

Example 6

The procedure is analogous to Example 1 and firing is in each case also carried out at 850°, 950° and 1000° C., but a 120 T screen is used. Glossy, color-stable, orange decorative films are obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A colored pigment comprising a platelet shaped substrate coated with a colored metal oxide or hydroxide in its maximum oxidation state, wherein said pigment contains at least about 10% by weight of aluminum oxide and is free of alkaline earth metal oxides, whereby said pigment has increased stability in engobes, glazes and enamels compared to conventional pigments.

2. A pigment according to claim 1, where the coating consists essentially of iron (III) oxide and aluminum oxide.

3. A pigment according to claim 1, wherein the substrate is a mica flake, talc, kaolin, glass, metal, a metal oxide flake, or a mica flake coated with a metal oxide or hydroxide.

4. A pigment according to claim 1, wherein the amount of aluminum oxide is about 10 to 70% by weight.

5. A pigment according to claim 1, wherein the amount of aluminum oxide is 15 to 35% by weight.

6. A pigment according to claim 2, wherein the ratio of iron oxide to aluminum oxide is about 10 to 0.5:1.

7. In a composition comprising an enamel or glaze and a colored pigment, the improvement wherein the pigment is one of claim 1.

8. In a coated article, having a coating comprising a glaze or enamel and a colored pigment, the improvement wherein the pigment is one of claim 1.

9. A colored pigment comprising a platelet shaped substrate coated with a colored metal oxide or hydroxide in its maximum oxidation state, wherein said pigment contains at least about 10% by weight of aluminum oxide and is essentially free of alkaline earth metal oxides, whereby said pigment has increased stability in engobes, glazes and enamels compared to conventional pigments.

10. A colored pigment comprising a platelet shaped substrate coated with a colored metal oxide or hydroxide, in its maximum oxidation state, wherein said pigment contains at least about 10% by weight of aluminum oxide and is free of alkaline earth metal oxides, whereby said pigment has increased stability in engobes, glazes and enamels compared to conventional pigment, and is prepared by a process comprising mixing an aqueous suspension of a platelet shaped substrate with a solution of an aluminum salt and additional metal salts, and adding thereto a base, whereby the substrate is coated with precipitated metal oxides or hydroxides, and the resultant coated substrate is dried and calcined.

11. A pigment according to claim 3, wherein the substrate is a mica flake.

* * * * *